United States Patent [19]

Drews et al.

[11] Patent Number: 5,768,607
[45] Date of Patent: Jun. 16, 1998

[54] METHOD AND APPARATUS FOR FREEHAND ANNOTATION AND DRAWINGS INCORPORATING SOUND AND FOR COMPRESSING AND SYNCHRONIZING SOUND

[75] Inventors: Paul C. Drews, Hillsboro; James P. Held; Dan Kogan, both of Portland; James A. Larson, Beaverton, all of Oreg.

[73] Assignee: Intel Corporation, Santa Clara, Calif.

[21] Appl. No.: 640,345

[22] Filed: Apr. 30, 1996

Related U.S. Application Data

[62] Division of Ser. No. 316,113, Sep. 30, 1994, abandoned.

[51] Int. Cl.[6] ............................................. G06F 17/00
[52] U.S. Cl. ........................... 395/773; 395/804; 345/302
[58] Field of Search ............................... 395/773, 806, 395/807, 776–778, 332, 340, 343–345, 804; 345/302

[56] References Cited

U.S. PATENT DOCUMENTS

| | | | |
|---|---|---|---|
| 5,199,077 | 3/1993 | Wilcox et al. | 395/2.65 |
| 5,467,288 | 11/1995 | Fasciano et al. | 395/806 |
| 5,493,557 | 2/1996 | Chatani | 369/124 |
| 5,526,407 | 6/1996 | Russell et al. | 379/89 |
| 5,530,898 | 6/1996 | Miyake | 395/834 |
| 5,535,063 | 7/1996 | Lamming | 360/4 |
| 5,544,297 | 8/1996 | Milne et al. | 395/806 |
| 5,559,942 | 9/1996 | Gough et al. | 395/349 |
| 5,577,188 | 11/1996 | Zhu | 395/326 |
| 5,583,980 | 12/1996 | Anderson | 395/173 |
| 5,600,775 | 2/1997 | King et al. | 395/806 |
| 5,608,872 | 3/1997 | Schwartz et al. | 395/200.04 |
| 5,625,833 | 4/1997 | Levine et al. | 395/800 |
| 5,638,501 | 6/1997 | Gough et al. | 395/135 |
| 5,649,104 | 7/1997 | Carleton et al. | 395/200.04 |
| 5,651,107 | 7/1997 | Frank et al. | 395/344 |

OTHER PUBLICATIONS

Edmondson, WideAngle 2.0, The CompuThink Windows Watcher, v. 2, n. 1, p. 13(1), Nov. 1991.

Transparent Window Selection, IBM Technical Disclosure Bulletin, v. 30, n. 11, pp. 268–271, Apr. 1988.

Ishii et al., ClearFace: Translucent Multiuser Interface for TeamWorkStation, Proc. of 2nd Euro. Conf. on Computer–Supported Cooperative Work (ECSCW '91), pp. 163–174, Sep. 1991.

Ishii et al., "Toward an Open Shared Workspace: Computer and Video Fusion Approach of TeamWorkStation", Comm. of ACM, v. 34, n. 12, pp. 37–50, Dec. 1991.

*Primary Examiner*—Joseph R. Burwell
*Attorney, Agent, or Firm*—Blakely, Sokoloff, Taylor & Zafman

[57] ABSTRACT

A method and apparatus creates and plays objects and sound synchronously after eliminating the silent segments of the sound. The method inserts sequence marks into the object and sound data, deletes silent segments of the sound data including the sequence marks that reside in the silent segments, and re-inserts the last deleted sequence mark back into the sound data. In so doing, the system detects the silent segments of the recorded sound stream data and deletes the silent portions from the recorded data. Upon replay of an object and its associated sound, any drawing done during the silent segments are played at the computer's full graphics drawing speed, only slowing down to real-time again when more sounds are encountered. Thus, the system plays "fast while silent" and slows to real-time when sounds are played. This saves the space required to stored the recorded sound, and the user does not have to wait through the silent periods.

5 Claims, 23 Drawing Sheets

As you remember, my interest in concertinas had been sparked by have been going through the music section of every bookstore a music store I come across for more information about concertina information out there. Early on in the game, I discovered that th comes under the name of "concertina" is something more properl conertina". This is the ⑥-sided, ⑧-sided, or sometimes even 12 usually comes to people's minds. However, its key organization notes is quite different than Bill's concertina.

The keyboard on each side of the instrument starts out with a tall index finger and middle finger of a given hand "walk" up this zigz Meanwhile, the index and middle finger of the other hand walk up own succession of thirds, one note higher. Thus to play a scale, side of the instrument. If you watch each hand, it's doing this zi

FIG. 3e

As you remember, my interest in concertinas had been sparked by playing with Bill's concertina. I have been going through the music section of every bookstore and the book section of every music store I come across for more information about concertinas. There is not a whole lot of information out there. Early on in the game, I discovered that the most popular instrument that comes under the name of "concertina" is something more properly referred to as the "English conertina". This is the ⑥-sided, ⑧-sided, or sometimes even 12-sided bellows instrument that usually comes to people's minds. However, its key organization and its complete philosophy of notes is quite different than Bill's concertina.

, oddly enough → 50

→ 10

4-sided →

The keyboard on each side of the instrument starts out with a tall, 2-wide zigzag of keys. The index finger and middle finger of a given hand "walk" up this zigzag to play a succession of thirds. Meanwhile, the index and middle finger of the other hand walk up their own zigzag to play their own succession of thirds, one note higher. Thus to play a scale, the notes alternate from side to side of the instrument. If you watch each hand, it's doing this zigzag walk. Set just a little farther outboard from each of these "main" keys is another key that has the respective flat or sharp of that

As you remember, my interest in concertinas had been
have been going through the music section of every b
music store I come across for more information about
infomation out there. Early on in the game, I discove
comes under the name of "concertina" is something
conertina". This is the 6-sided, 8-sided, or sometim
usually comes to people's minds. However, its key orga
notes is quite different than Bill's concertina.

The keyboard on each side of the instrument starts
index finger and middle finger of a given hand "walk"
Meanwhile, the index and middle finger of the other

As you remember, my interest in concertinas had been have been going through the music section of every b music store I come across for more information about infomation out there. Early on in the game, I discove comes under the name of "concertina". This is something conertina". This is the 6-sided, 8-sided, or sometim usually comes to people's minds. However, its key orga notes is quite different than Bill's concertina.

*re-phrase*

The keyboard on each side of the instrument starts index finger and middle finger of a given hand "walk" Meanwhile, the index and middle finger of the other

*check spelling*

65
68

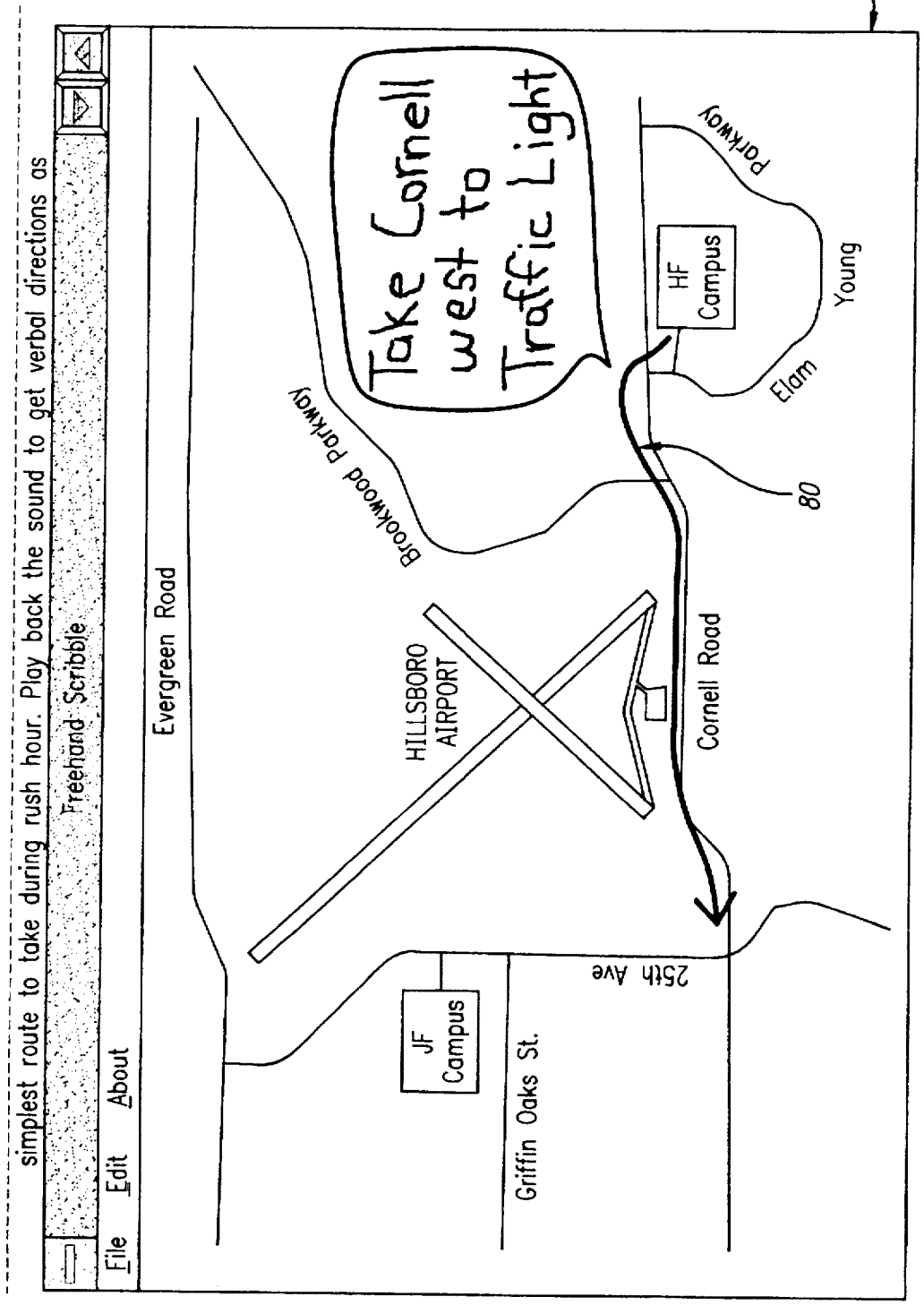

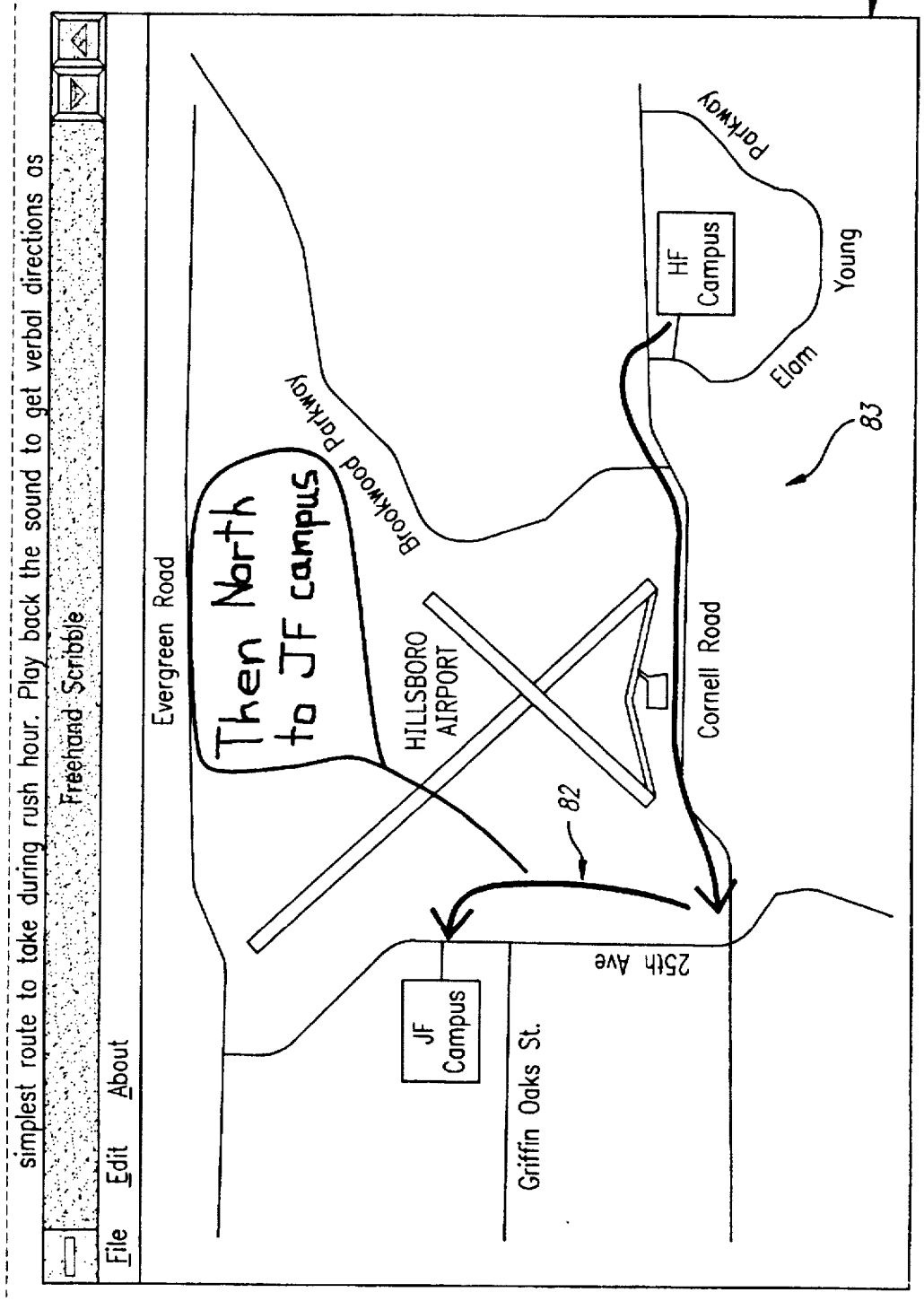

$2x + 5 = 17$ (solve for x) — 100

$2x = 12$ (subtract 5 from both sides) — 102

$x = 6$  (divide both sides by 2) — 104

103

METHOD AND APPARATUS FOR FREEHAND ANNOTATION AND DRAWINGS INCORPORATING SOUND AND FOR COMPRESSING AND SYNCHRONIZING SOUND

This is a divisional of application Ser. No. 08/316,113, filed Sep. 30, 1994, now abandoned.

BACKGROUND OF THE INVENTION

1. Field of the Invention

The present invention relates to the field of annotation of electronic documents and freehand drawing applications that incorporate sound.

2. Background Information

Definition

An application program (or simply, application) is software that is not part of the underlying computer's operating system and performs a collection of related functions on behalf of users and under their control. Application programs allow users to create and manage different kinds of information. Examples of applications include, but are not limited to, spreadsheets, word processors, drawing packages, presentation graphics. An application can be characterized by (a) a user interface, that is, the way in which users interact with the application, (b) a data storage scheme, that is, the way in which the application stores its data, and (c) the internal manipulations and transformations that the application applies to the data. In general, applications that fall in the same category have similar behavior but differ in their user interfaces, their data storage schemes, and their internal transformations. For example, there are several dozen word processing programs currently available.

A document refers to the data that users create using an application program. Users retrieve, manipulate and save the contents of a document using the same application that they used to create the document in the first place. Examples of documents include spreadsheets created by spreadsheet programs, reports created by word processors, and others.

Annotation refers to descriptive or explanatory comments, drawings or notes that are attached as remarks to portions of a document. An annotation window refers to a window that displays annotation as it is created or edited. An annotation object refers to what is contained in an annotation window. As will be shown later, in the present invention, when the annotation window is closed, the annotation object becomes embedded (or "pasted") into the document.

An annotation mark is a mark placed on the document to let a user know that there is an annotation object associated with the annotation mark. While annotation marks are traditionally used in the prior art, annotation marks are not needed when using the present invention.

An object refers to one or more drawings created by the present invention. All drawings contained in one window are referred to as one object. Thus, one object is created per window.

Object linking and embedding (OLE) refers to a mechanism that allows certain documents called container documents (or client documents in OLE jargon) to contain information created by applications, such as an OLE server, different from those used to create the container document. A container document is created using a container application. A user-oriented description of OLE is found in *Microsoft Windows User's Guide* (Microsoft Corp., 1992). As the name implies, OLE supports two different types of containment: embedding and linking. When the foreign data is embedded in a container document, it physically resides within the container document. When the foreign data is linked to the container document, only a reference to the foreign data resides in the container document. The contents comprising the foreign data usually reside elsewhere, typically in another electronic file in the file system. Further details regarding OLE may be found in *Object Linking & Embedding Version 1.0 Reference Guide*(Microsoft Corp., 1992).

Description of the Related Prior Art

Currently, annotation under Microsoft Windows may be performed by one of the two schemes described below: First, if a user desires to include annotation in a document, a separate application program is used to draw an annotation object to be inserted into the document using OLE. This is illustrated in FIGS. 1a and 1b. Referring to FIG. 1a, after the user opens a document 14, if the user desires to include an annotation at a location 12, he/she invokes a separate application program for annotation so that an annotation window 16 is displayed over document 14. The user creates an annotation object 18 by entering or drawing various characters and/or pictures on window 16. When the annotation is complete, annotation window 16 disappears leaving an annotation mark 20 to indicate that there is an annotation object at location 12, as shown in FIG. 1b.

A disadvantage of this scheme is that an annotation cannot be done "in-place." An "in-place" annotation allows a user to create an annotation object directly over the portion of the document being annotated and allows both the annotation object and the portion of the document being annotated to be visible. In FIG. 1a, if annotation window 16 is placed over the portion of the text at location 12, annotation window 16 will cover up the portion of the underlying text. Because annotation window 16 has an opaque background, the portion of the text under annotation window 16 will not be visible.

In addition, once the annotation is completed, because only annotation mark 20 is shown at location 12, to see annotation object 18, one needs to reopen annotation window 18. When annotation window 16 is reopened, it is not placed at location 12 since if it does, the portion of the text near location 12 under window 16 will not be visible. This scheme is inconvenient since the portion of the document to be annotated becomes invisible if annotation window 16 is placed at the annotation location. To show both the text of the document being annotated and annotation object 18, they have to be placed at different locations.

Second, each application can be programmed to include the capability of "in-place" annotation instead of using a separate annotation application program. However, this scheme is impractical for the three reasons described below: First, there is high labor overhead in reprogramming each application in which annotation is desired. Second, there is high labor overhead in reprogramming for every type of desired annotation in each application. Third, it is unlikely that an application designer will be able to anticipate every future type of annotation that will be desired by the application's users.

The purpose of the present invention is to overcome the deficiencies of the existing state of the art by performing "in-place" annotation using a separate annotation application program to avoid reprogramming existing applications. The present invention employs novel application-independent methods for creating, editing and displaying freehand annotation objects on transparent windows so that the annotation objects can be placed over the desired locations on the document and be seen with the portions of the document under the annotation objects. This effectively allows the user to draw the annotation objects directly over the desired annotation locations on the document. Since the present invention requires no special assistance from the application program that displays the container document, there is no need to reprogram the document's application program. In addition, the present invention provides methods and apparatus for supporting sound during "in-place" annotation. The present invention can be conveniently used with various application programs using OLE.

SUMMARY OF THE INVENTION

The present invention provides application-independent methods and apparatus for creating and displaying "in-place" annotation with or without sound so that both the annotation object and the portion of the document under the annotation object are visible simultaneously and for replaying objects on a display synchronized with recorded sound after eliminating the silent segments of the recorded sound.

A method for "in-place" annotation according to the present invention includes the following steps: (a) displaying a first document on a display using a first application program; (b) invoking the present invention's annotation application program; (c) setting the background of an annotation window to be displayed transparent; (d) displaying the annotation window on the display over a selected area of the first document wherein the selected area of the first document is visible through the annotation window; (e) setting the background of an annotation object in the annotation window to be displayed transparent; (f) displaying the annotation object in the annotation window wherein the selected area of the first document is visible through the annotation window; (g) closing the annotation window; and (h) embedding the annotation object in the selected area of the first document wherein both the annotation object and the selected area of the first document are visible.

A method for compressing a sound data and for synchronizing an object data and the sound data includes the following steps: (a) storing the object data and recording the sound data while inserting sequence marks in the object and sound data; (b) deleting the silent segments of the sound data including the sequence marks that reside in the silent segments; and (c) re-inserting the last deleted sequence mark back into the sound data.

Upon invoking the object and sound data to play, the present invention plays the sound data while searching for sequence marks in the sound data. Upon encountering a sequence mark, the present invention plays the object data on the display at the computer's full graphics drawing speed from where the object data has been last played to a sequence mark in the object data corresponding to the sequence mark found in the sound data. Thus the present invention plays the object data and the sound data synchronously in real-time. Since the silent segments of the sound have been deleted, the present invention plays the object data fast when there is no sound to be played and in real-time when there are sounds to be played.

The present invention also includes a method for re-drawing a transparent window and its object using the following sequence: determining whether the transparent window is the active window, hiding the transparent window and its object, yielding a central processor unit to other applications to re-draw their windows and contents (or objects), showing the transparent window and its object, and making the transparent window active if the transparent window was active prior to re-drawing the window.

BRIEF DESCRIPTION OF THE DRAWINGS

FIG. 1b presents a prior art annotation mark inserted into the document in FIG. 1a.

FIG. 3e presents the annotation object of FIG. 3d embedded in the document of FIG. 3a upon closing the annotation window of FIG. 3d according to the present invention.

FIG. 3g presents the annotation object of FIG. 3f embedded in the document of FIG. 3a upon closing the annotation window of FIG. 3f according to the present invention.

FIG. 4c presents the annotation object of FIG. 4b embedded in the document of FIG. 4a upon closing the annotation window of FIG. 4b according to the present invention.

FIG. 4d presents the document of FIG. 4c having the annotation object and its associated sound being played according to the present invention.

FIG. 6a presents an annotation window of the present invention displayed over a map to provide a direction.

FIG. 6b presents the annotation window of FIG. 6a after an additional direction is added to the annotation object.

DETAILED DESCRIPTION OF THE INVENTION

GENERAL SYSTEM CONFIGURATION

Figure 1A:
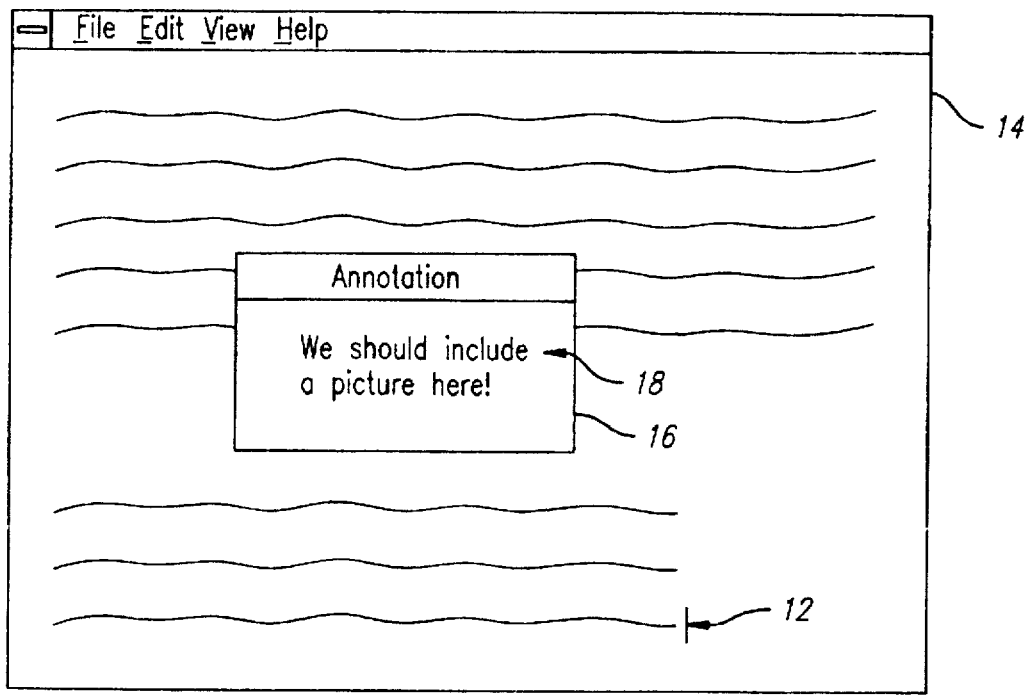
FIG. 1a presents a prior art annotation window displayed on a document.
Figure 1B:
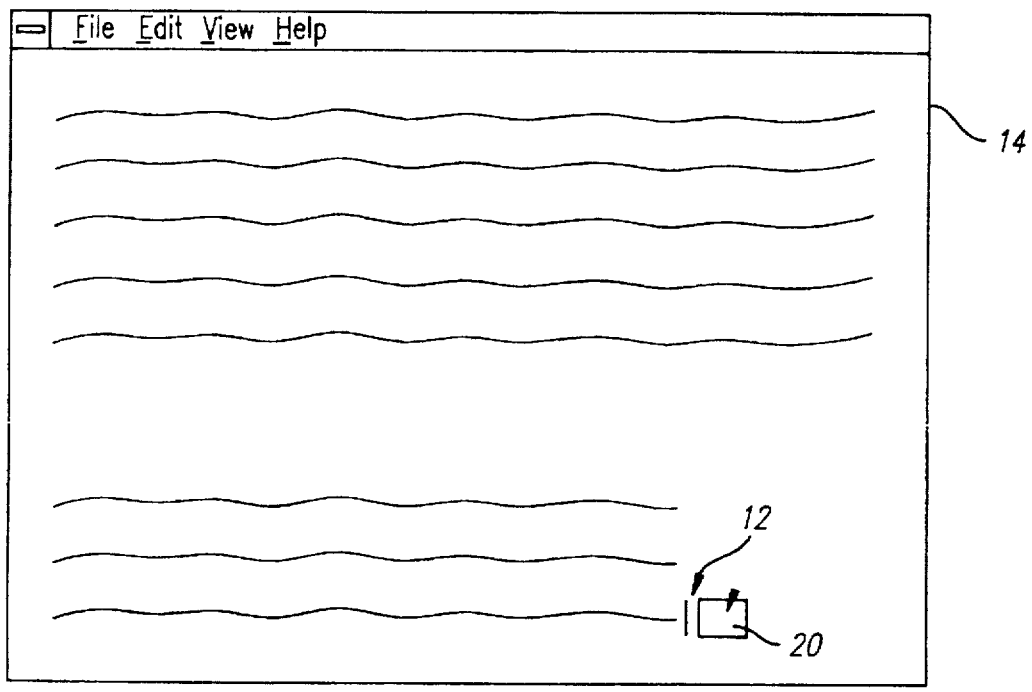
Figure 2:
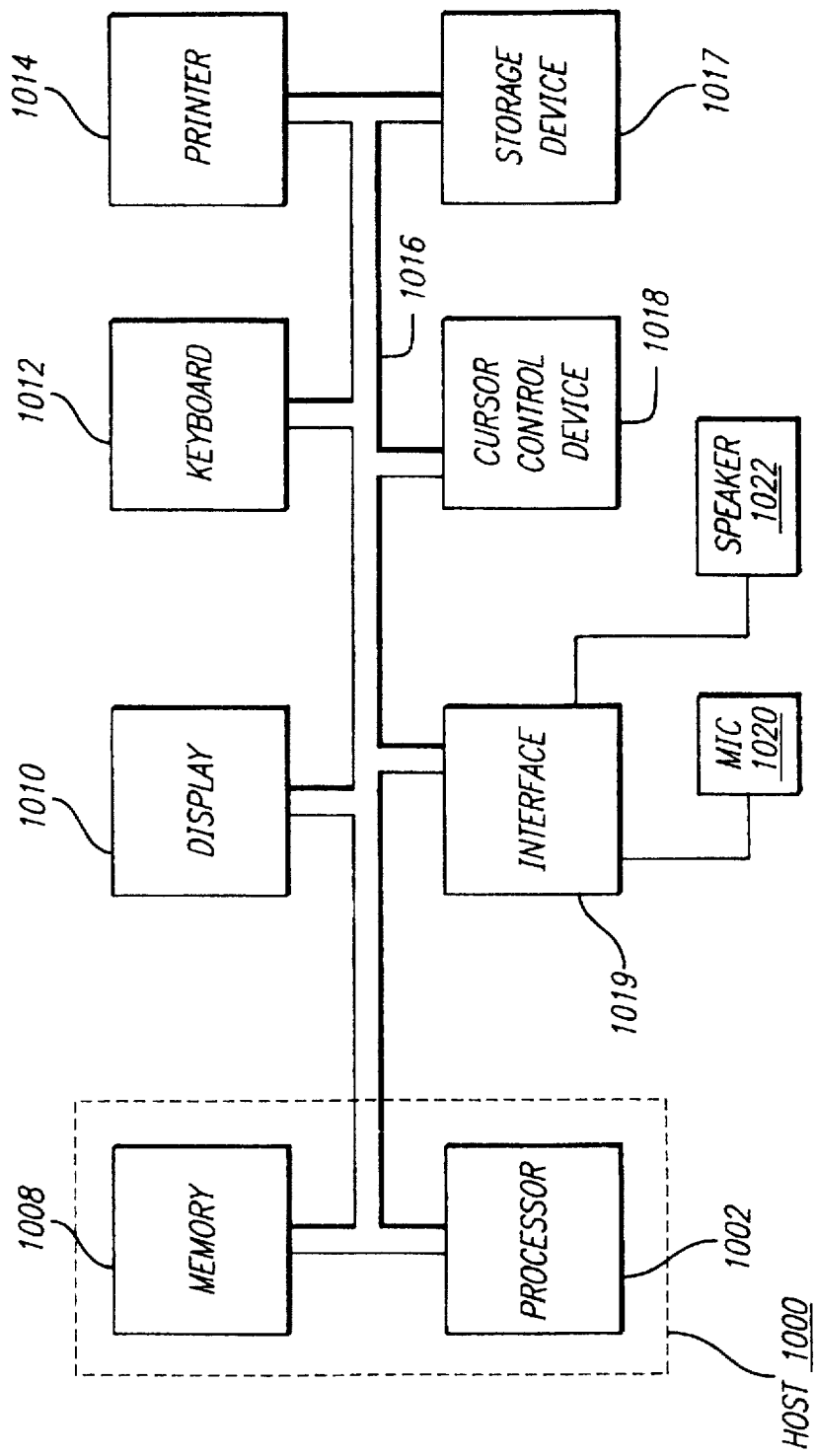
FIG. 2 is a block diagram of an exemplary computer system using the present invention.

FIG. 2 shows a typical computer system that can be used to perform application-independent "in-place" annotation or drawings with sound according to the present invention. The computer system may include a computer host 1000 having a memory 1008 and a central processor 1002. Memory 1008 and central processor 1002 are those typically found in most general purpose computers and almost all special purpose computers. In fact, these devices contained within computer host 1000 are intended to be representative of the broad category of data processors and memory. Many commercially available computers having different capabilities may be used in the present invention.

A system bus 1016 is provided for communicating information. A display device 1010 utilized with the computer system of the present invention may be a liquid crystal device, cathode ray tube or other display device suitable for creating graphic images and/or alphanumeric characters recognizable to a user. The computer system may also include an alphanumeric input device 1012 including alphanumeric and function keys coupled to bus 1016 for communicating information and command selections to central processor 1002, and a cursor control device 1018 coupled to bus 1016 for communicating user input information and command selections to central processor 1002 based on a user's hand movement. Cursor control device 1018 allows the user to dynamically signal the two-dimensional movement of the visual symbol (or cursor) on a display screen of display device 1010. Many implementations of cursor control device 1018 are known in the art, including a track ball, mouse, pen, joystick or special keys on the alphanumeric input device 1012, all capable of signaling movement in a given direction or manner of displacement.

The computer system of FIG. 2 also includes an interface device 1019 coupled to bus 1016 for communicating information to and from the computer system. Interface device 1019 may be coupled to a microphone 1020, a speaker 1022, a modem, a network system, other memory devices, other computers, etc. Also available for interface with the computer system of the present invention is a data storage device 1017 such as a magnetic disk or optical disk drive, which may be communicatively coupled with bus 1016, for storing data and instructions. The computer system of FIG. 2 may also include a printer 1014 for outputting data.

VARIOUS USES OF THE PRESENT INVENTION

Before discussing the details of the features of the present invention, various uses of the present invention are described with reference to FIGS. 3a–3g, 4a–4d, 5, 6a–6c, 7a–7d and 8 to illustrate the benefits and capabilities of the present invention. It will be appreciated that there are other ways to use the present invention besides those described below. To illustrate the sound capability of the present invention, the figures use cartoon-style "balloons" to indicate what is being said, recorded or played. In reality, these balloons do not appear on the display. The words shown in the balloons are spoken and recorded as one creates the objects and are played as one re-plays the recorded sound. The balloons are chosen only as a convenient notation to illustrate the sound capability of the present invention.

Marking Up a Document Without Sound

Figure 3A:
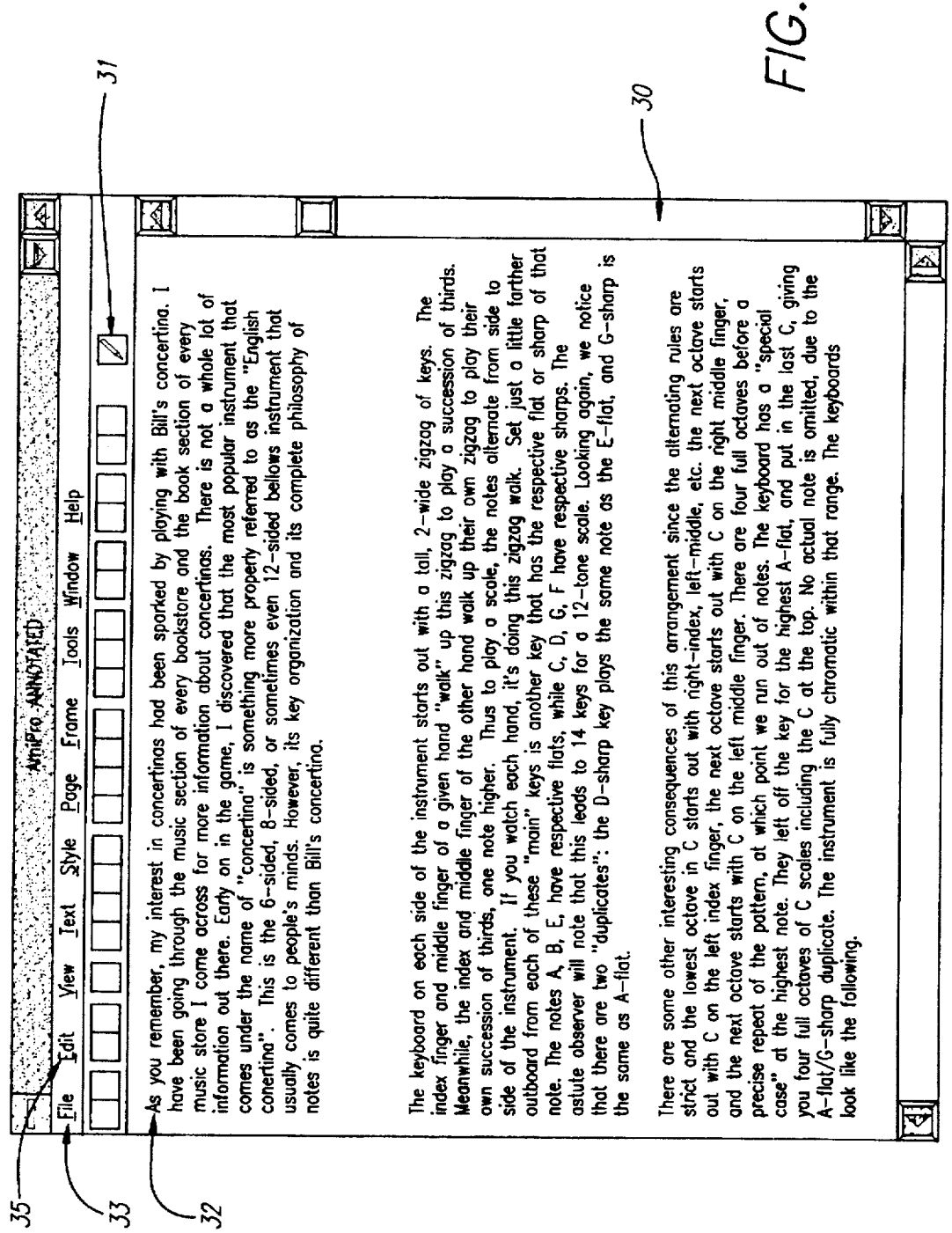
FIG. 3a is a document to be marked up using "in-place" annotation without sound according to the present invention.

FIGS. 3a–3g illustrate a scenario where one reviews and marks up a document using the present invention's application independent "in-place" annotation without sound. Referring to FIG. 3a, after a user (one who reviews the document) starts an application, he/she opens a document 30. In this instance, a word processor Ami Pro from Lotus is used to create document 30 for illustration. The present invention's application program is independent of the application used to create document 30.

Figure 3B:
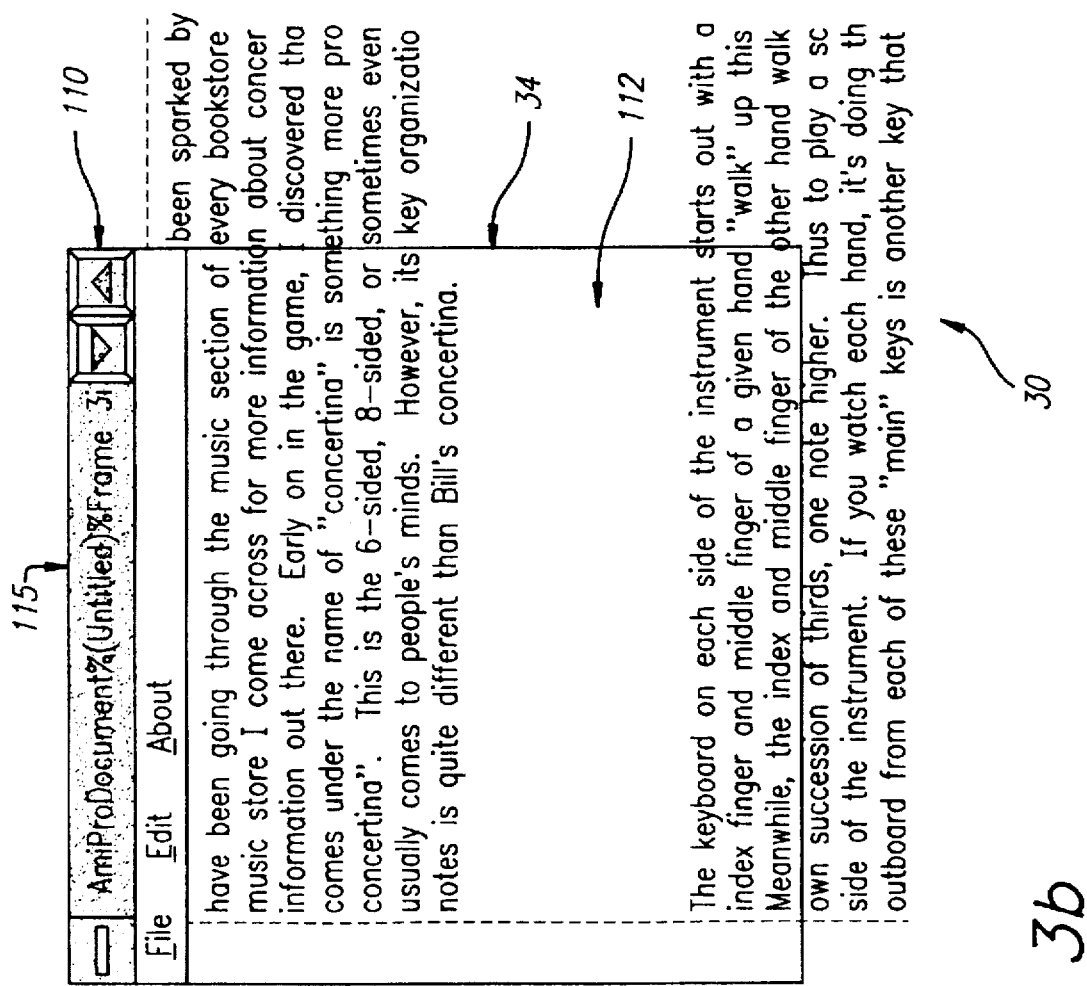
FIG. 3b presents an annotation window placed over the document of FIG. 3a according to the present invention.

While the cursor is at a location 32, if the reviewer invokes the annotation application program of the present invention, an annotation window 34 appears, as shown in FIG. 3b, with its upper left corner placed approximately at location 32 so that annotation window 34 can be placed over the portion of document 30 to be annotated. In this example, the annotation application of the present invention is invoked by clicking an icon 31 in FIG. 3a. Icon 31 runs an Ami Pro macro that invokes the annotation application. If an application has no such macro capability, it typically has a command option for invoking an annotation application program. Such a command option may be located in one of the menus such as "File" 33, "Edit" 35, etc. of FIG. 3a. In FIG. 3b, while annotation window 34 is displayed, annotation window 34 is active, and the window in which document 30 appears is temporarily inactive. Because annotation window 34 is transparent, the reviewer can see the portion of document 30 under annotation window 34 while he/she draws on annotation window 34. This gives the effect of marking directly on document 30, as shown in FIG. 3c.

Figure 3C:
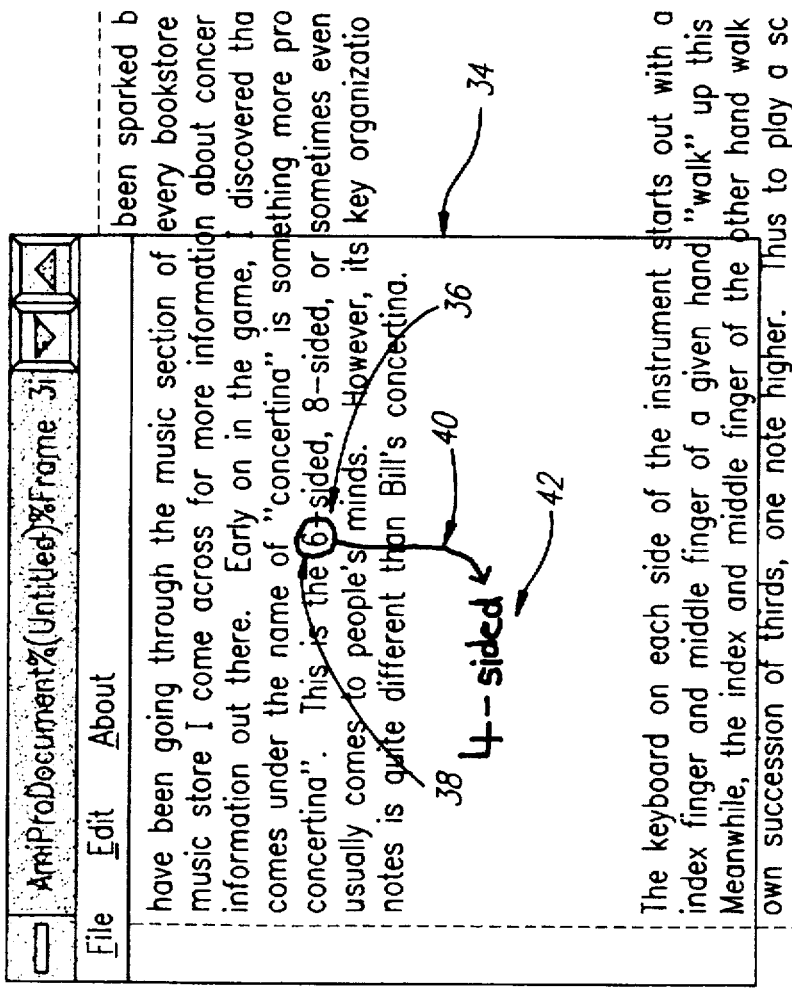
FIG. 3c presents the annotation window of FIG. 3b after an annotation object is drawn according to the present invention.
Figure 3D:
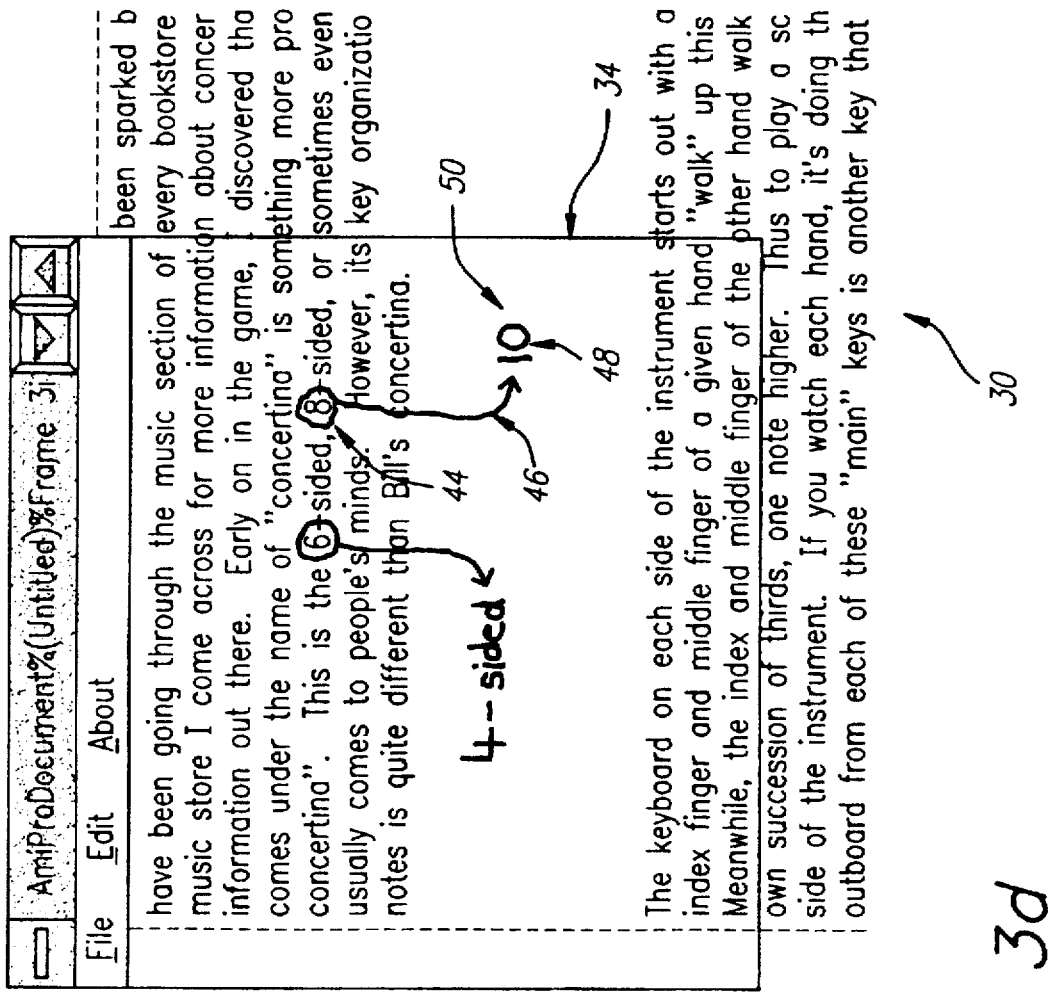
FIG. 3d presents the annotation window of FIG. 3c after more drawings are added to the annotation object of FIG. 3c according to the present invention.

Referring now to FIG. 3c, when the reviewer realizes that the term "6-sided" at a location 36 should be "4-sided," he/she draws a circle 38 around the number "6," draws an arrow 40 and writes "4-sided" on annotation window 34 over document 30 using a cursor control device such as a mouse or pen. In FIG. 3d, when the reviewer realizes that the number "8" should be "10," he/she marks up the number "8" and writes the correction in a similar manner. Although the annotation object 50 including the circles, arrows, "4-sided" and "10" is created on annotation window 34, it appears to the reviewer that he/she is drawing directly on document 30 because annotation window 34 is transparent. In FIG. 3e, when the reviewer closes annotation window 34, annotation object 50 is inserted (or in effect, pasted) into document 30 using OLE, and document 30 becomes the active window again.

Now referring to FIG. 3f, as will be described more in detail later with reference to editing capabilities of the present invention, when the reviewer desires to make an additional note such as ", oddly enough," the reviewer can invoke annotation window 34, stretch the size of annotation window 34 to include the area of interest, and add the notation ", oddly enough" in annotation window 34.

In FIG. 3g, when annotation window 34 is closed, annotation object 50 is embedded (or pasted) into document 30 using OLE. After closing document 30, if it is reopened, the reviewer can choose to display document 30 with annotation object 50 as shown in FIG. 3g or document 30 without annotation object 50. It should be noted that the object created in FIGS. 3c–3g has foreground only. The object has no background.

Marking Up a Document With Sound

Figure 4A:
FIG. 4a presents an annotation window having an annotation object and its associated sound to mark up a document according to the present invention.
Figure 4B:
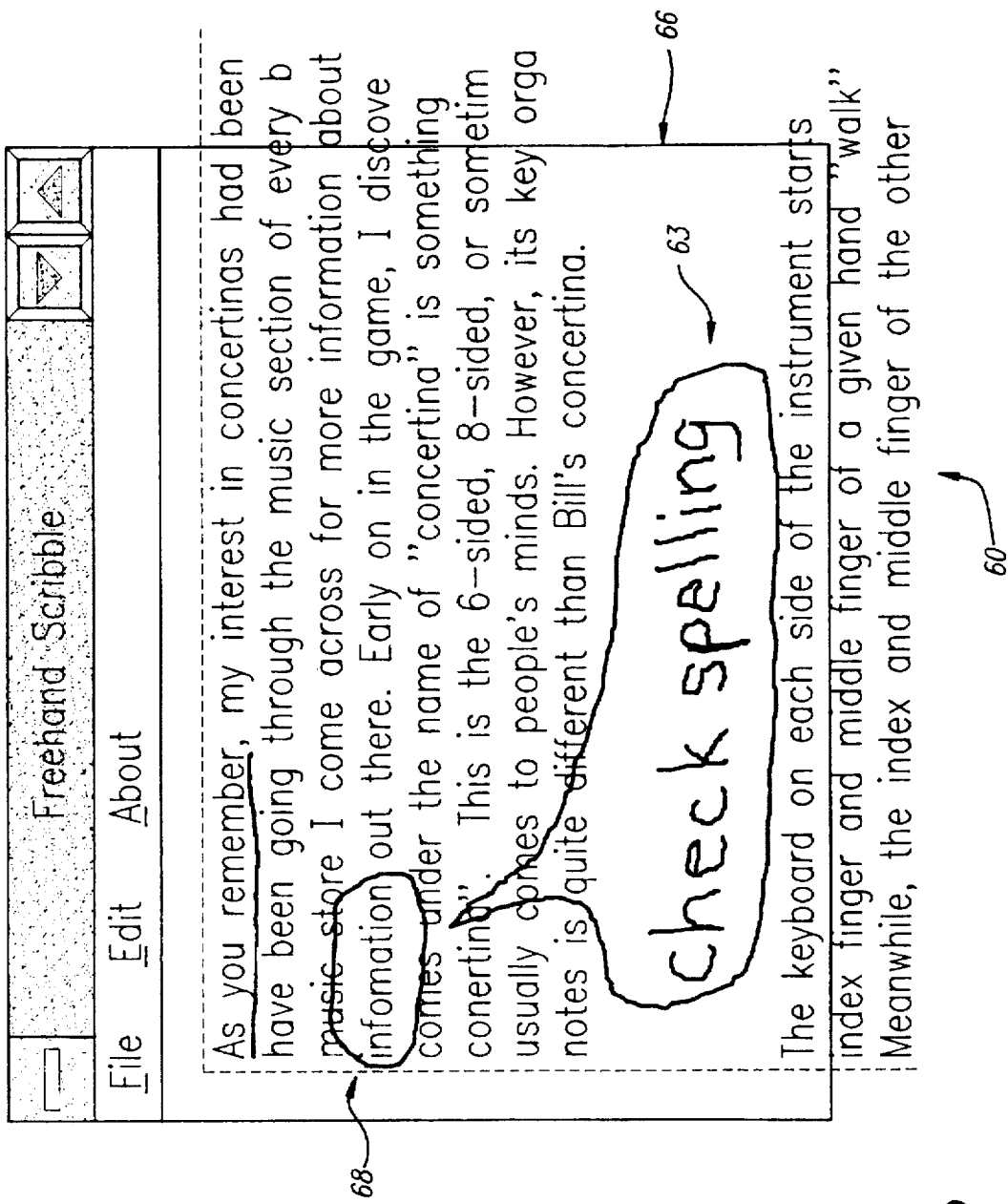
FIG. 4b presents the annotation window of FIG. 4a after additional annotation is made according to the present invention.

FIGS. 4a–4d illustrate a scenario where one uses the present invention to review and mark up a document using "in-place" annotation with sound. Referring to FIG. 4a, after opening a document 60 and invoking the annotation application of the present invention, the reviewer underlines a phrase 62 "As you remember," as he/she speaks and records a message 64 "re-phrase." As described before, a balloon is used to indicate what is being said, but is not drawn by the user. The balloon does not appear on the display. In FIG. 4b, the reviewer circles "infomation" and says, "check spelling."

In FIG. 4c, when annotation window 66 is closed, underline 65 and circle 68 are inserted into document 60 using OLE. FIG. 4d illustrates what happens when the annotation is played. The drawing and the sound are played synchronously so that as one hears "re-phrase," he/she sees underline 65 being drawn, and as one hears "check spelling," he/she sees circle 68 being drawn. The synchronization of the sound and drawing is discussed in detail later with reference to FIGS. 11a, 11b and 12.

Although the previous examples illustrate annotation done on documents created by a word processing program, it will be appreciated that the present invention's annotation application program can be used with any program having OLE capabilities.

Describing Items on a Display

Figure 5:
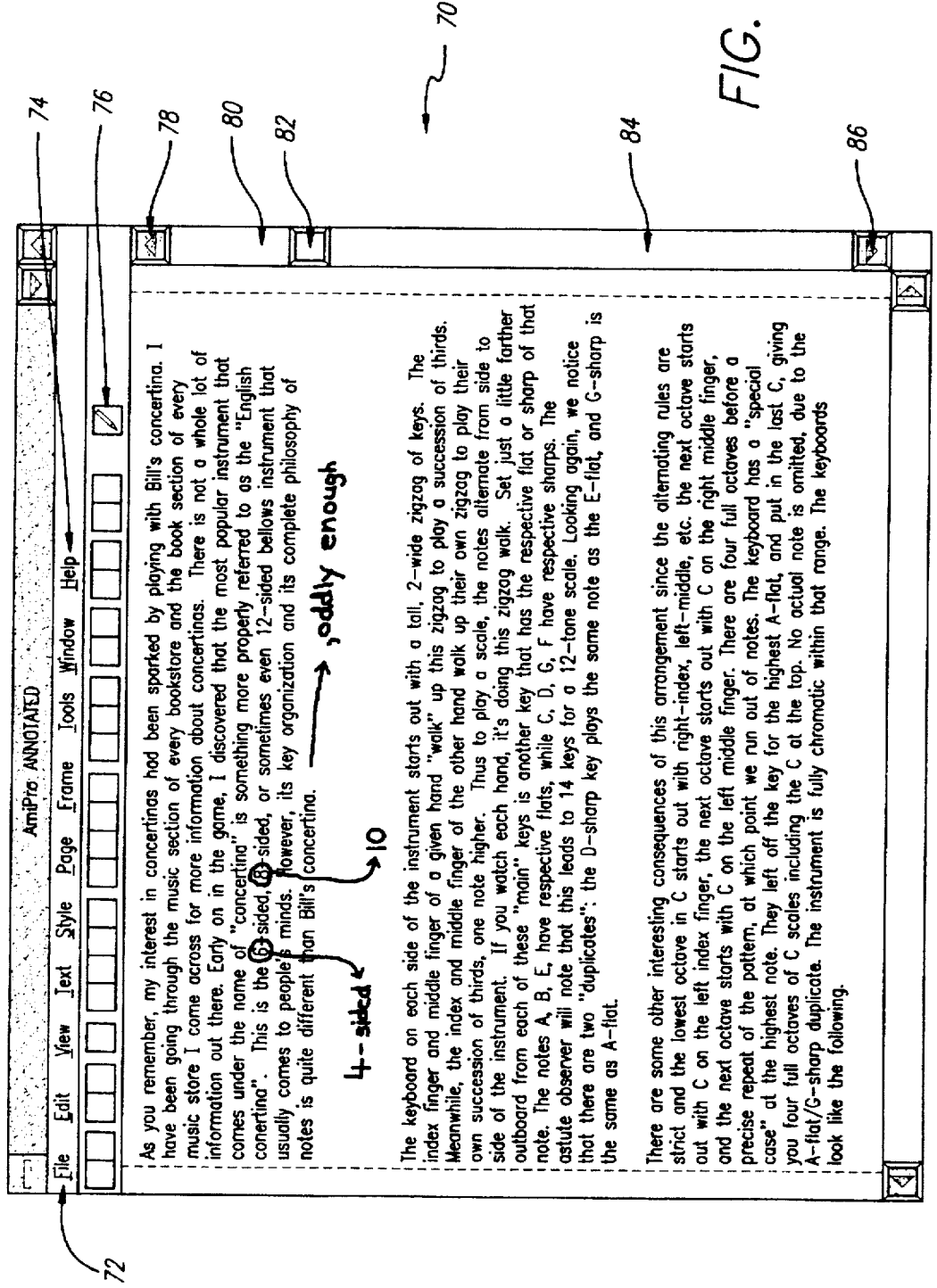
FIG. 5 presents an annotation window of the present invention used to point to and describe various items shown on a display.

FIG. 5 illustrates a scenario where the present invention is used to point to and describe various items shown on a display. After the user invokes the annotation application of the present invention, he/she can resize an annotation window 70 so that it covers the entire display area. As one circles an item (e.g., a circle 72, 74 or 76), he/she can explain the function of each item being circled. When one wants to explain the scrolling capabilities of application program Ami Pro, he/she can draw an arrow (e.g., arrow 78, 80, 82, 84 or 86) on annotation window 70 to describe each of these items. In this way, the present invention can be used to mark up the entire display. The present invention acts as a transparency on which one can write while he/she records messages.

Map With Explanation

Figure 6C:
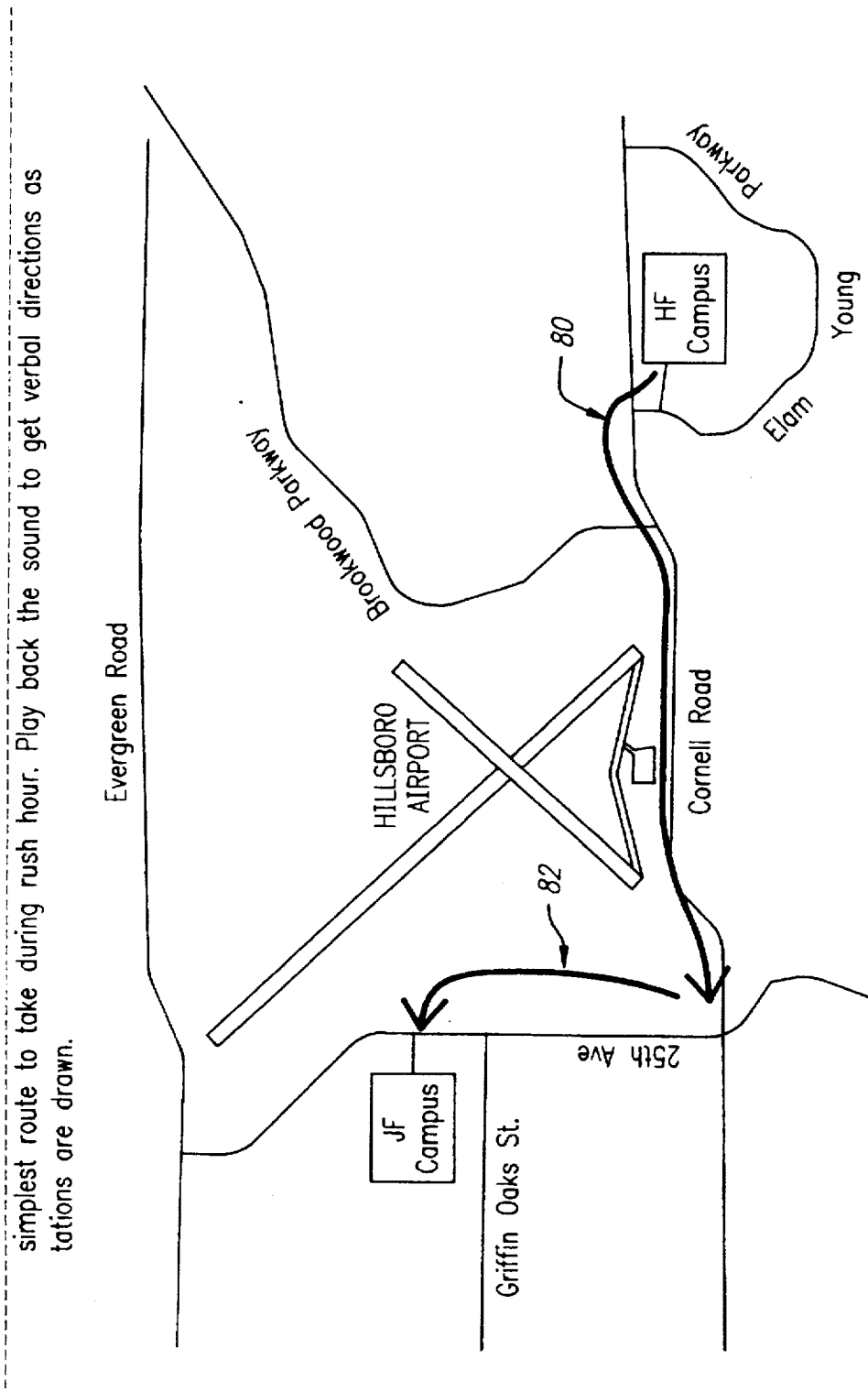
FIG. 6c presents the annotation object of FIG. 6b embedded in the map of FIG. 6a upon closing the annotation window of FIG. 6b according to the present invention.

FIGS. 6a–6c describe how the present invention can be used to provide a direction on a map. For example, Y needs a direction to get from HF Campus to JF Campus, so X prepares the following map with explanation. Only a simple example is shown here not to clutter the description of the present invention; however, it will be appreciated that as the map and the direction become more complex, the preset invention becomes more useful.

In FIG. 6a, as X draws an arrow 80, X speaks and records the message, "Take Cornell West to Traffic Light." In FIG. 6b, as X draws another arrow 82, X speaks and records the message, "Then North to JF Campus." In FIG. 6c, when X closes annotation window 84, the display shows the map with arrows 80 and 82. When X finishes making the direction on the map, X can send the map to Y electronically. When Y plays the map, Y hears the narration recorded by X and sees arrows 80 and 82 drawn on the map at the same time. Since Y hears the narration, he/she has a verbal description of the landmarks corresponding to the map. In addition, X now has a map with the arrows that X can carry with him/her when he/she travels from HF Campus to JF Campus.

Rough Draft Figures

FIGS. 7a–7d illustrate how rough draft figures can be generated conveniently and quickly using the present invention. This is an example where the present invention is used by itself ("stand-alone") rather than using the present invention to create annotation for a document of another application. In this example, X wants to write a memo proposing a new family of network adapter products that insulate the system software from the networks.

Figure 7C:
FIG. 7c is the rough draft figure of FIG. 7b having additional drawings and sound added.
Figure 7D:
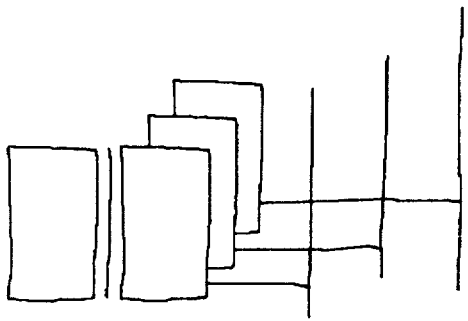
FIG. 7d is the finished picture of the rough draft figure of FIG. 7c.
Figure 7A:
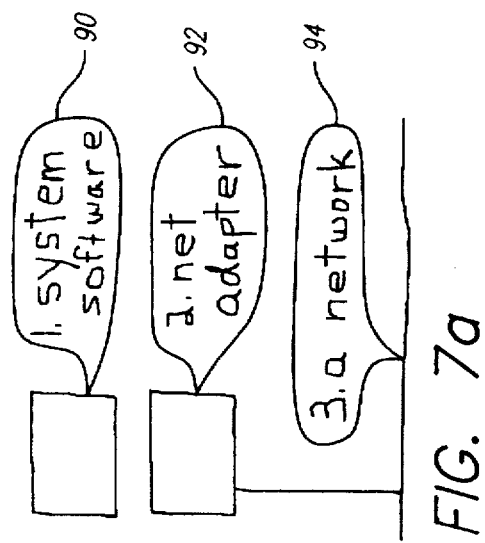
FIG. 7a is an example of a rough draft figure with narration created by the present invention.
Figure 7B:
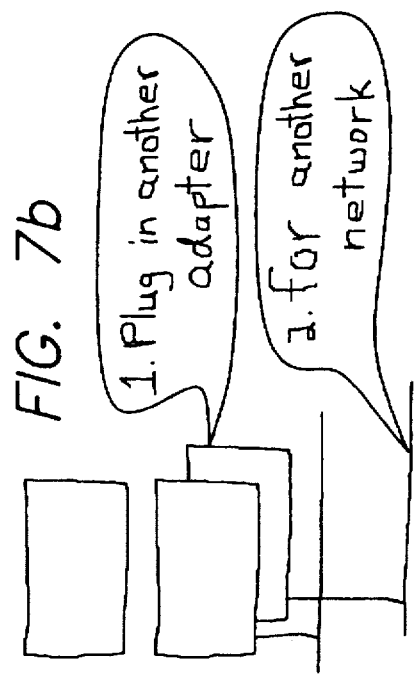
FIG. 7b is the rough draft figure of FIG. 7a having additional drawings and sound added.

In FIG. 7a, X starts the process by drawing a simple picture. As X draws the picture, he/she speaks and records the words indicated in balloons 90, 92 and 94. As described before, X does not draw or fill in the balloons. The balloons are simply shown to illustrate that those words are spoken by X as he/she draws the picture. In FIGS. 7b and 7c, X continues to add more pictures and record more words. FIG. 7d shows the finished picture. The drawing having recorded sound can be created in a short amount of time. In this example, it took X only thirty-five seconds to draw and record his/her voice.

Once X is finished with the drawing, X may send the drawing with the voice to his/her co-workers to make counter-proposals in a similar fashion without spending much time. They can continue to modify the drawing until they all agree on a design at which point they can make a final drawing using a more extensive drawing application package.

Tutorial Lecture

Figure 8:
FIG. 8 is an example of a class session created by the present invention.

The present invention can also be used by an instructor for teaching students. This is another example of using the present invention as a "stand-alone" application. FIG. 8 illustrates how a mathematics teacher can record his/her class session for his/her students. As the teacher writes various mathematical equations, he/she speaks and records the words shown in balloons 100, 102 and 104. When a student plays the class session, he/she hears the words and sees the equations displayed synchronously as the teacher drew and recorded them.

MAKING OF THE PRESENT INVENTION

Creating An Object

In creating an object, whether it is an annotation object (e.g., object 50 in FIG. 3d, object 63 in FIG. 4b or object 83 in FIG. 6b) or a "stand-alone" object (e.g., object 93 in FIG. 7c or object 103 in FIG. 8), the present invention includes the following features.

First, in the present invention, either transparent or non-transparent drawings can be selected. When the present invention is used as an annotation application program (e.g., see FIGS. 3a–3g, 4a–4d, 5 or 6a–6c), transparent drawings are selected so that both the annotation window and the area under the annotation window are visible at the same time.

The present invention's annotation window is in effect used as a transparency on which the user can make various marks over the desired area of the document under the annotation window.

There are two types of objects: those with a foreground only and those with both a foreground and a background. Some drawing objects, such as the freehand annotation object 50 in FIG. 3d, have foreground only. However, other drawing objects such as characters, dashed lines, or cross-hatched areas have both foreground and background. In creating transparent drawings, if the object 50 in FIG. 3d has no background, the background of the object does not need to be set be transparent before displaying the object. But if the object has a background, the background of the object must be set to be transparent before displaying the object to ensure that the drawing is transparent. When objects having both foreground and background are used in annotations, setting the background to be transparent before displaying the object assures that the area of the document under the background area of the objects remains visible. When the present invention has transparent drawings selected, the present invention selects a transparent background drawing mode for all the objects it draws.

In addition, to create transparent drawings, the background of the window must be transparent. The "background brush" parameter of AfxRegisterWndClass, which is a standard Windows function, is set to "NULL" to make the window background transparent. The present invention draws its own background, if required, depending on whether transparent or non-transparent drawings are selected.

When the present invention is used as a "stand-alone" application (see, e.g., FIGS. 7a–7d or 8), the background of the present invention's window and objects is drawn non-transparent.

When the present invention is used as an annotation application program as in FIG. 4a–4d, the background of the present invention's window and objects is kept transparent.

Second, besides incorporating sound, the present invention includes freehand drawings as well as other drawing objects (e.g., text, lines, arcs, or polygons). However, by limiting the present invention to freehand drawings, the objects can be created, edited, and displayed very quickly.

Figure 9A:
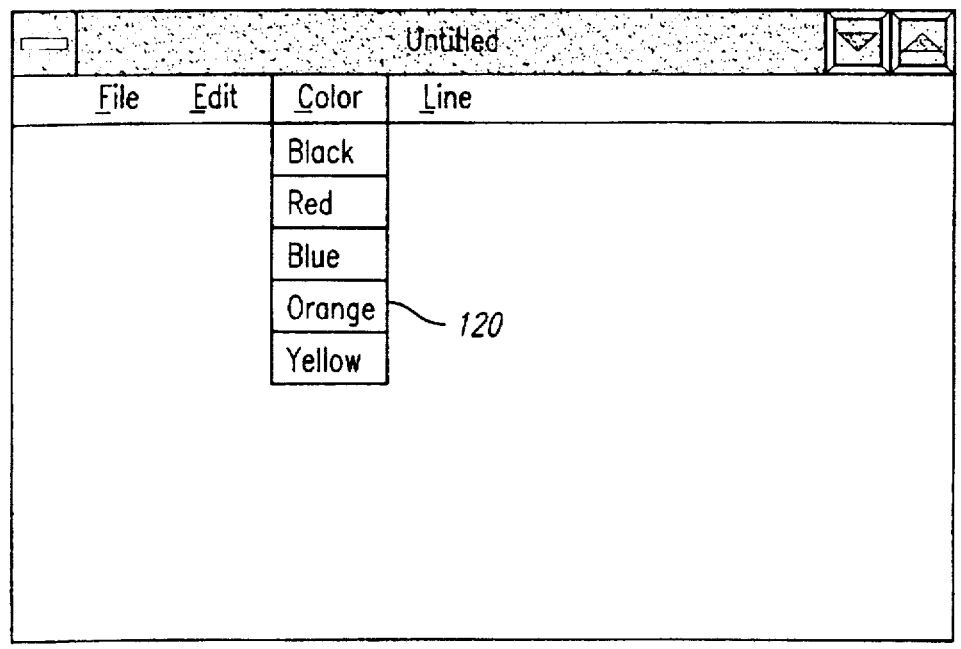
FIG. 9a is a window having a menu for colors according to the present invention.
Figure 9B:
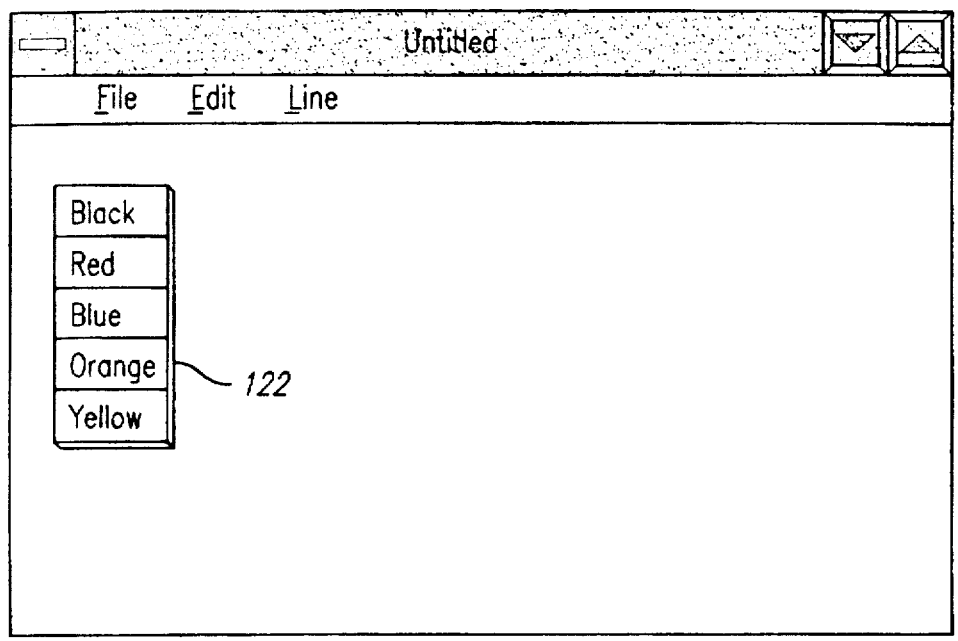
FIG. 9b is a window having a tool bar for colors according to the present invention.

Third, in the present invention, the drawings can be done using different colors. Because choosing a color can be inconvenient to the user, the present invention records the last color used and starts the drawing with that color. There are many ways to provide a menu for colors. Two examples are shown in FIGS. 9a and 9b. In FIG. 9a, the colors are provided in a pull-down menu 120. In FIG. 9b, the colors are shown in a color tool bar 122. In another embodiment, the user may be able to change the color by "speaking" to the computer. The color capability is beneficial in drawing overlapping lines or in adding a revised drawing over the original drawing.

Fourth, the present invention may include the capability of changing the line width or style (e.g., dotted, dashed, solid, arrowhead, etc.). Different line widths can be chosen from a pull-down menu or a line tool bar similar to those shown in FIGS. 9a and 9b.

Fifth, multiple objects may be created while the present invention is used as an annotation application. For example, in FIGS. 4a and 4b, while the annotation is done using one annotation window, the user may create other annotation windows for document 60. After closing annotation window 66, the user may place the mouse at another location in document 60 and invoke the present invention's annotation application program again to create a new object on another window. It will be appreciated that instead of creating multiple objects using multiple windows, one can also use one annotation window to annotate the entire document by resizing the annotation window as shown in FIG. 3f.

Finally, multiple objects can be created when the present invention is used as a "stand-alone" application. For example, while all the equations shown in FIG. 8 may be part of one object (that is, they are created in one window), each may be a separate object created in a separate window.

Editing Windows, Objects and Sound

The present invention provides various editing capabilities for editing the present invention's window, its objects and recorded sound whether the present invention is used as an annotation application or "stand-alone" application.

Figure 3F:
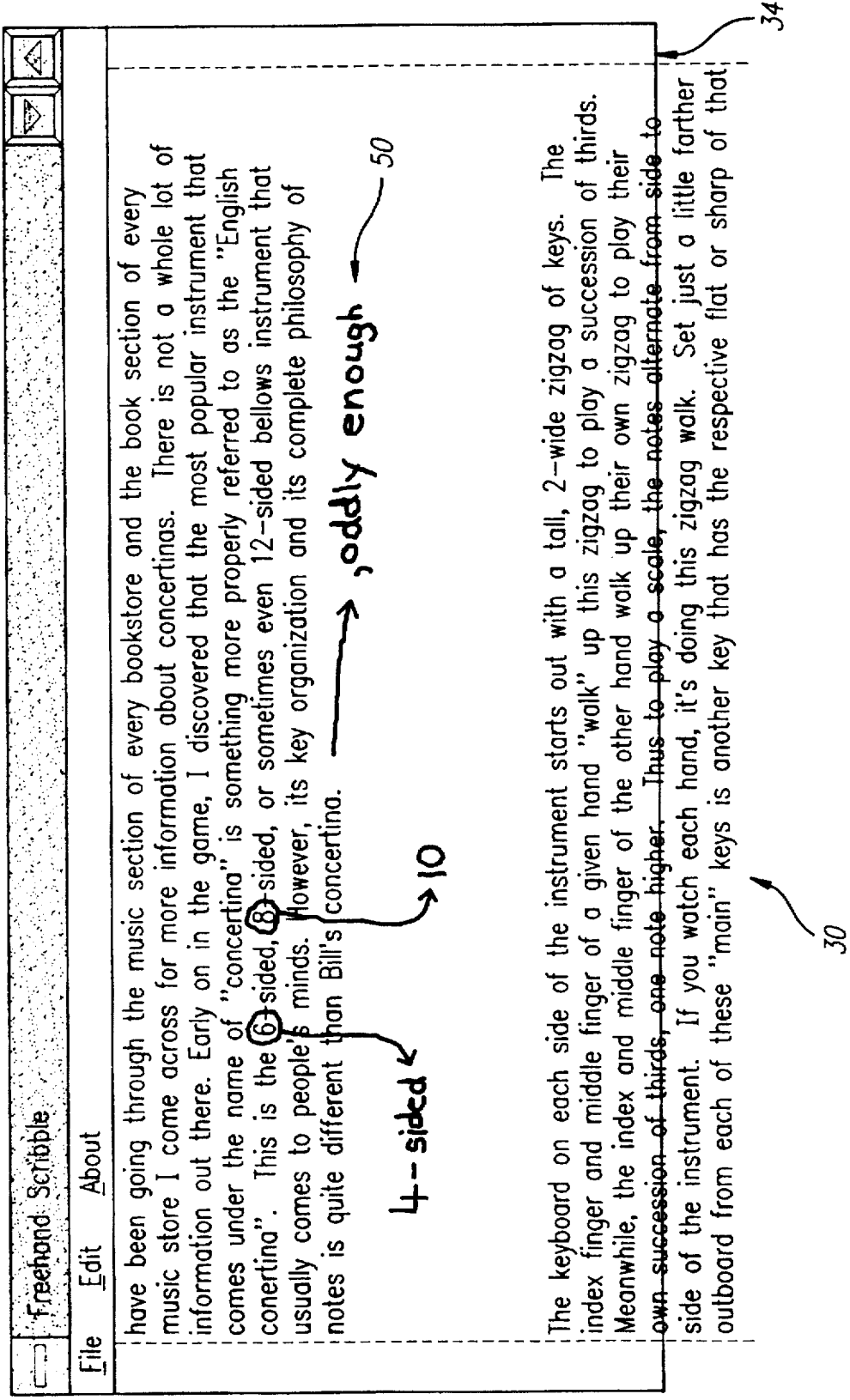
FIG. 3f presents the annotation window of FIG. 3d after more drawings are added to the annotation object of FIG. 3d according to the present invention.

With respect to windows, the present invention's window such as annotation window 34 in FIG. 3d can be resized as shown in FIG. 3f. In addition, the present invention's window can be moved by dragging the window. For example, in FIG. 3b, the user can point to a title segment 115 of annotation window 34 and drag annotation window 34 using a mouse.

In editing objects, the present invention can use any of the features described above with respect to creating an object as well as the following features that are used in editing objects and sounds:

First, drawings and sounds can be appended to the existing object data and recorded sound data, respectively. In FIG. 3f, the freehand drawing of an arrow and the hand written phrase ", oddly enough" are appended to the existing object data. If the user also speaks and records words while drawing the arrow and the hand written phrase ", oddly enough," then the new drawing consisting of the arrow and the phrase is appended to the existing object data while the speech is appended to an existing recorded sound data. If there is no previously recorded sound data, then the speech will be recorded as a new sound data.

Second, the present invention supports "delete" functions. There may be at least three different types of "delete" functions: a clean slate, backspace and eraser. The clean slate is used to delete the entire object data and the recorded sound data in a single operation. Upon execution of the clean slate function, the user starts with a blank window having no sound recorded.

The backspace can be used to delete strokes (or fragments of strokes) backward from the last to the first. However, no sound is deleted. After executing the backspace operation, if the user plays the object and the sound, the present invention draws the original unedited drawing of the object with sound (if there was sound recorded) and deletes the strokes as the user did.

The eraser is used to wipe off any or all portions of the drawing of an object as if erasing a white-board wish a white-board eraser. But no sound is deleted. After executing the eraser operation, if the user plays the object and the sound, the present invention draws the original unaltered drawing with sound (if there was sound recorded) and erases the portion of the drawing as the user did.

Playing Objects and Sound

The present invention includes various capabilities and characteristics of an OLE server supporting a container application. Because of the unique relationship between an OLE server and a container application as described in the background information documents *Microsoft Windows User's Guide* and *Object Linking & Embedding Version 1.0 Reference Guide*, when the present invention, as an OLE server, supplies information or "command verbs" to the container application, the container application can display or "play" the information or incorporate the command verbs through OLE so that the user can invoke them from the container application.

When the present invention is used as an annotation application supporting a container application, the annotation of the present invention can be shown on a display in at least two ways. First, the annotation objects of the present invention can be shown on the display as a "static image." The present invention which is an OLE server supplies the complete final drawing, such as the object (65 and 68) in FIG. 4c, for the container application to show on the display.

When a container application shows an annotation supplied by the present invention as a static image, it can treat the image as a stand-alone image or as a transparent overlay. When the container application treats the image as a stand-alone image, the container application rearranges its own display to make room for the stand-alone annotation image. On the other hand, when the container application treats the image as a transparent overlay as in FIG. 4c, it keeps its own display 60 the same as it was without any annotations. After drawing its own display 60, the container application draws the annotation object (65 and 68) on top of its own display. The present invention supplies the drawing objects with transparent background in its static image so that the container application's display 60 remains visible in the background.

Second, the annotation objects of the present invention can be replayed as a "dynamic image" synchronized with the recorded sound. The present invention can support a "play" verb so that the container application can replay the annotation object as a dynamic image. This "play" verb will be accessible from the container application. When the "play" verb is invoked, the present invention replays the recorded sound and draws the objects synchronized with the sound in the way they were drawn when the annotation was created.

When a container application replays an annotation object supplied by the present invention as a dynamic image, the container application may also show the annotation object as a static image. The present invention can replay the annotation objects of its dynamic image in at least three different ways. First, the present invention can simply re-draw the annotation objects over the annotation objects already shown on the container document. In this case, if the container application also shows the annotation's static image, the dynamic image may be difficult to distinguish from the static image. Second, the present invention can draw the annotation objects using a different contrasting color over the annotation objects already shown on the container document. Third, the present invention can erase the annotation objects shown on the document and then draw the annotation objects.

It will be appreciated that when a container application supports replaying an annotation supplied by the present invention as a dynamic image having sound, the container application can provide various forms of invoking the "play" verb including but not limited to: invoking the "play" verb when the user double-clicks a portion of the annotation object; invoking the "play" verb when the document is opened; or invoking the "play" verb when a pull-down menu command is invoked. The implementation of the "play" verb is provided by the present invention. Thus, when the container application invokes the "play" verb, the present invention plays the annotation including the objects and the sound.

When the present invention is used a stand-alone application (e.g., see FIGS. 7a–7d and 8), the objects of the stand-alone application can be displayed as static images or played as dynamic images synchronized with the recorded sound using methods similar to those described above with respect to an annotation application. The only difference is that the present invention rather than the container application displays the objects and provides a user interface to play the sound.

Showing an Object on a Transparent Window

To show or draw an object having foreground only and no background on a transparent window, the present invention uses the following sequence: After the features of a frame such as frame 110 in FIG. 3b are set, and the present invention's window is set to have a transparent background, the window with a transparent background such as window 34 in FIG. 3b is displayed. Once the window is shown, since there is no background, the foreground of the object can be drawn immediately on the window.

To show or draw an object having both foreground and background on a transparent window, the present invention uses a sequence similar to that of showing an object having foreground only, as described above. However, the major difference is that when the object has both foreground and background, the background of the object must be set to be transparent before showing the foreground so that when the foreground of the object is shown on the window, the object 146 is displayed as in FIG. 10a rather than FIG. 10b.

Figure 10A:
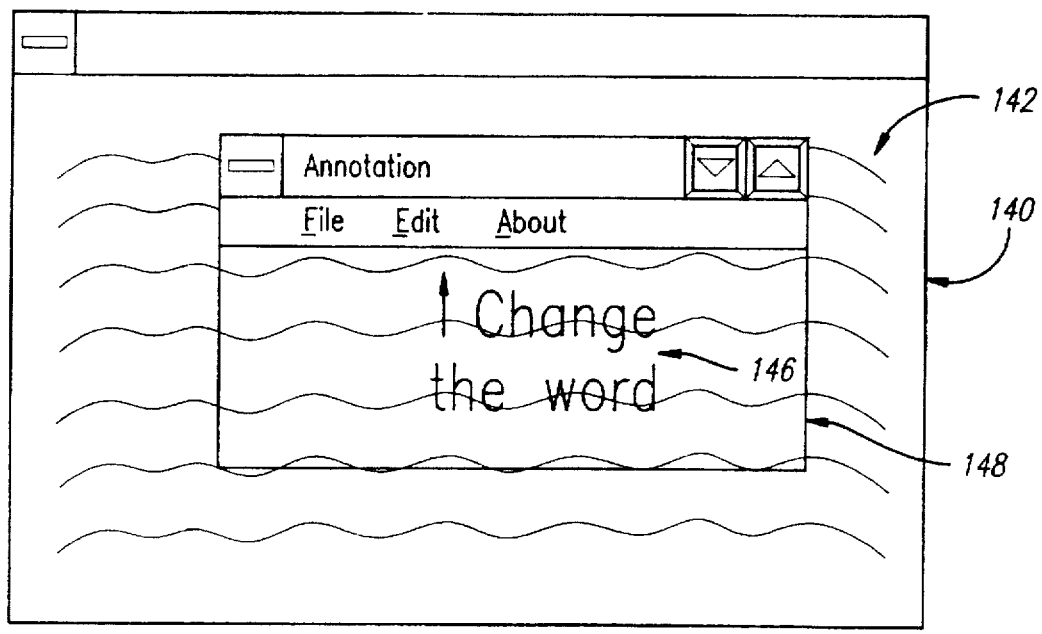
FIG. 10a presents an annotation window having a transparent window background and a transparent object background over a document according to the present invention.
Figure 10B:
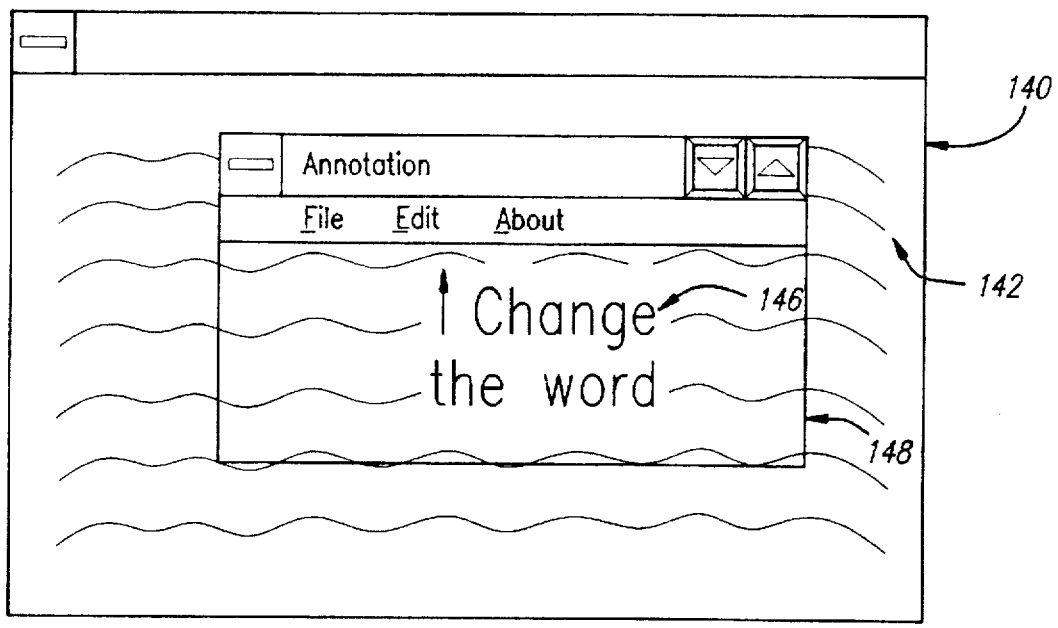
FIG. 10b presents an annotation window having a transparent window background and a non-transparent object background over a document.

In FIG. 10a, an annotation window 148 is shown over a document 140. Curly lines 142 represent the text of document 140. Annotation window 148 is transparent so that the text 142 of underlying document 140 shows through annotation window 148. The background of annotation object 146 is also transparent so that annotation object 146 does not cover up the portions of the underlying text 142. However, in FIG. 10b, because the background of annotation object 146 is non-transparent, some portions of the underlying text 142 are hidden.

When non-transparent drawings are selected, the present invention sets the background of the objects to be drawn on the present invention's window to be an opaque white color and draws the entire background of the present invention's window with an opaque white color.

Re-Drawing Transparent Windows

The present invention's window may need to be re-drawn when either the present invention's window or another window is moved or resized or when the contents of an active window is modified. When the present invention's window is used with a transparent background such as annotation window 34 in FIG. 3c, to ensure that the present invention's window is re-drawn with a transparent background, the following sequence is used in the present invention:

Check whether the present invention's window is the active window.

Hide the present invention's window.

Yield processor 1002 in FIG. 2 to let other applications re-draw their windows and contents. In the preferred embodiment, this step is repeated ten times to ensure that all the windows except the present invention's window are updated before the present invention's window is re-drawn. In another embodiment, this step may be repeated less than or greater than ten times or may not be repeated.

Show the present invention's window and make it active or inactive depending on whether it was active or inactive prior to the re-drawing sequence.

Figure 13:
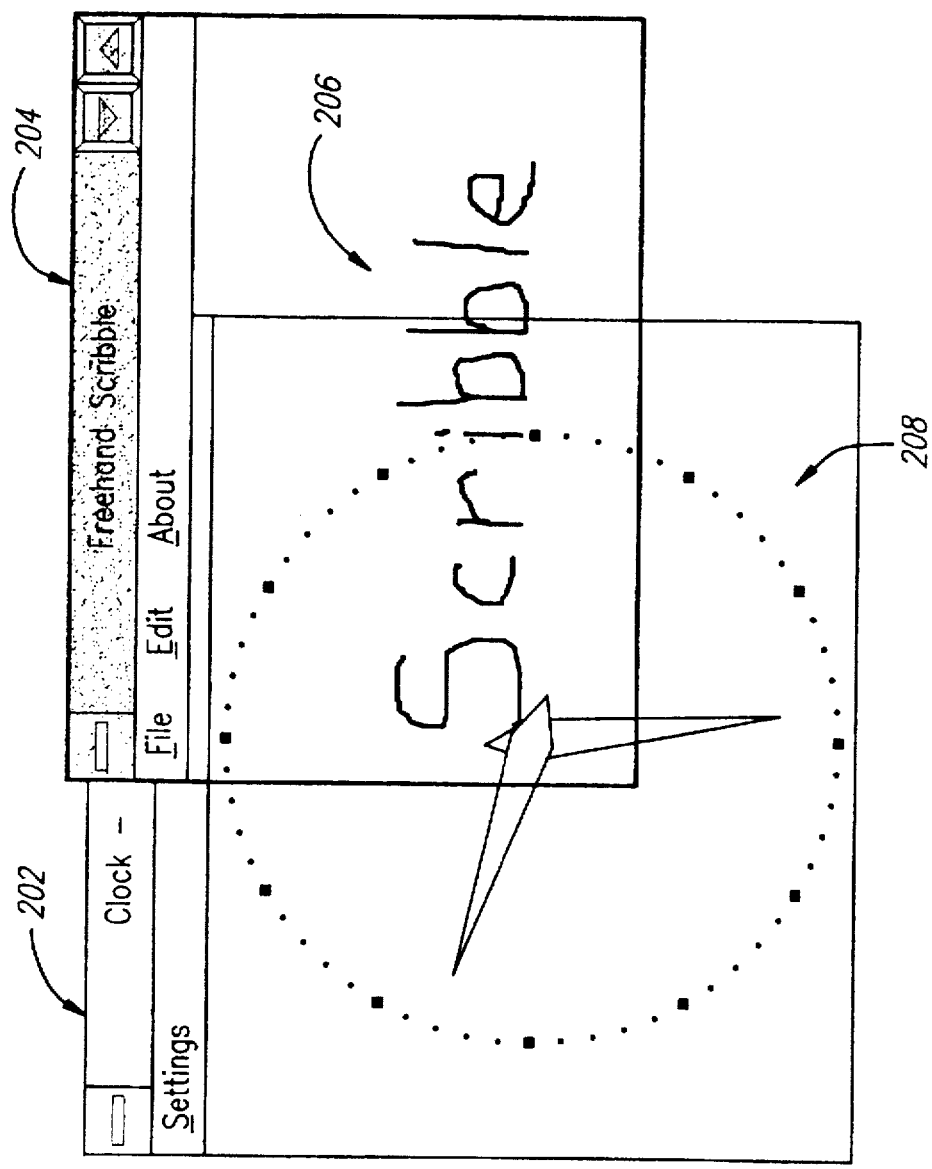
FIG. 13 presents a clock window and a present invention's window.

It should be noted that the present invention's window is not re-drawn when the contents of an inactive window is modified. FIG. 13 shows a clock window 202 having a clock 208 and a present invention's window 204 having an object 206. Although the hands of clock 208 continuously move, thus modifying clock window 202, the present invention's window 204 is not re-drawn because clock window 202 is inactive.

Compressing and Synchronizing Data

The present invention detects the silent segments of the recorded sound stream data and deletes the silent portions from the recorded data. Upon replay of an object and its associated sound, any drawing done during the silent segments are played at the computer's full graphics drawing speed, only slowing down to real-time again when more sounds are encountered. Thus, the present invention is played "fast while silent" and slows to real-time when sounds are played. This saves the space required to store the recorded sound, and the user does not have to wait through the silent periods.

The present invention inserts sequence marks into the sound stream data being recorded and the cursor-movement-and-action data (or the draw data) so that the sound and draw data can be synchronized with each other when they are replayed. The draw data contains information of all the cursor movements and cursor actions including button-up and button-down events.

Figure 11A:
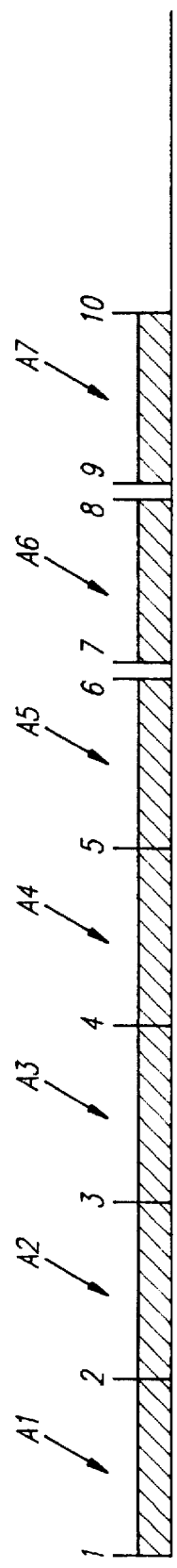
FIG. 11a is a draw data, with embedded sequence marks, created by the present invention.
Figure 11B:
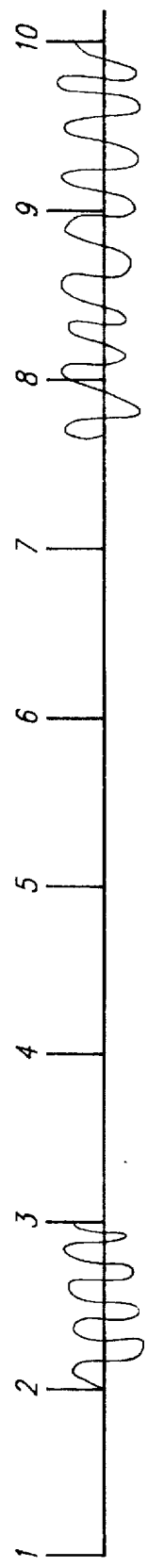
FIG. 11b is a sound data, with embedded sequence marks, created by the present invention.
Figure 12:
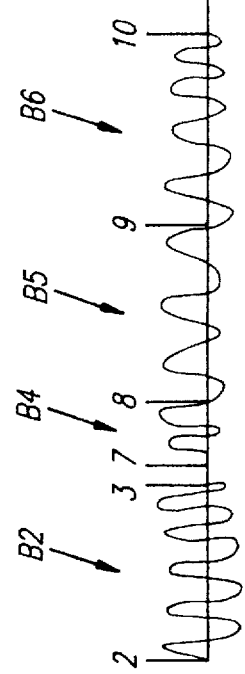
FIG. 12 is the sound data of FIG. 11b after being compressed according to the present invention.

FIGS. 11a, 11b and 12 illustrate how the sound stream data is compressed while preserving the synchronization between the sound stream data and draw data when they are replayed. FIG. 11a shows the draw data. The time sequences are marked 1 through 10. The hatched areas indicate that some draw data are stored. Even when there is no draw data stored during certain time periods such as between time periods 6 and 7 and between time periods 8 and 9, the sequence marks are stored in the draw data.

FIG. 11b shows the sound stream data. Sounds are recorded between time periods 2 and 3 and between time periods 7¾ and 10 as shown by the wavy lines. Other parts of the sound stream data contain only silence and sequence marks. The sound stream data in FIG. 11b is compressed into the one shown in FIG. 12. To compress the sound stream data, the silent segments such as the blocks between time periods 1 and 2 and between time periods 3 and approximately 7¾ are deleted including the sequence marks from the sound stream data. Then the last deleted sequence mark is re-inserted into the sound stream data in place of the deleted sound segments, as shown in FIG. 12. This sound compressing mechanism eliminates the storage space required for the silent segments and the inconvenience of waiting through the silent segments of the recording when an object and its associated sound are played.

In operation, when the user plays an object and the sound, the present invention plays the sound stream data while examining it for sequence marks. Upon encountering one of the sequence marks, the present invention plays the draw data from where it was last played up to the sequence mark in the draw data corresponding to the one just found in the sound stream data. This allows the draw data to catch up in drawing even if some sequence marks are missing in the sound stream data and to be played "fast while silent."

This operation is illustrated referring to FIGS. 11a and 12. When the user plays the object having the draw data shown in FIG. 11a and the sound stream data shown in FIG. 12, the present invention plays the sound stream data while examining it for sequence marks. In FIG. 12, the first sequence mark 2 is encountered immediately. The present invention then plays the draw data (section A1) up to sequence mark 2 at the full available drawing speed. Upon completion of drawing the draw data up to sequence mark 2, the present invention resumes playing the sound stream data, while examining it for sequence marks. After having played the sound data in section B2, the present invention encounters sequence mark 3 in the sound stream data. The present invention then plays the draw data (section A2) from where it left off up to the matching sequence mark 3 at the full available drawing speed. Upon completion of drawing the data up to sequence mark 3, the present invention resumes playing the sound stream data, while examining it for sequence marks. The next sequence mark 7 in FIG. 12 is encountered immediately. The present invention then plays the draw data (sections A3, A4, and A5), shown in FIG. 11a, from where it left off up to the matching sequence mark 7 at the full available drawing speed.

The present invention continues this process through the remainder of the sound data (sections B4, B5, and B6). Whenever it encounters a sequence mark in the sound stream data (e.g., 8, 9, and 10) it stops playing the sound data, plays the draw data from where it left off up to the matching sequence mark in the draw data, and resumes playing the sound data. Thus the drawings become synchronized with the real-time sound data whenever a sequence mark is encountered in the sound stream data. The present invention uses a short time interval between sequence marks so that the drawing proceeds smoothly.

When there is a long silent interval in the original recording, many sequence marks are deleted from the sound stream data when the present invention compresses the sound data (e.g., sequence marks 4, 5, and 6 in FIG. 11b). When the present invention replays the compressed sound data that has had a long silent interval removed, it replays a long sequence of draw data at the full available drawing speed (e.g., the draw data between sequence marks 3, 4, 5, 6, and 7 in FIG. 11a). Thus the present invention replays drawings "fast while silent."

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for compressing a sound stream data and synchronizing an object data and said sound stream data, said method comprising the steps of:

storing said object data while inserting a plurality of first sequence marks into said object data, and recording said sound stream data while inserting a plurality of second sequence marks into said sound stream data;

deleting, without requiring user intervention, at least one silent segment of said sound stream data and any second sequence marks that reside in said at least one silent segment;

re-inserting the last deleted second sequence mark to said sound stream data in place of the deleted sound segment;

playing said sound stream data while searching for one of said second sequence marks; and displaying said object data at the highest drawing speed from where said object data has last been displayed to one of said first sequence marks corresponding to said one of said second sequence marks found whereby said object data may be synchronized to said sound stream data if some said second sequence marks are missing.

2. The method according to claim 1 further comprising the steps of:

displaying said object data at the highest drawing speed until encountering one of said first sequence marks;

playing said sound stream data until encountering one of said second marks;

repeating, until all of said sound stream data is played and all of said object data is displayed, the further steps of:

displaying said object data at the highest drawing speed from where said object data has last been displayed to one of said first sequence marks corresponding to said one of said second sequence marks found whereby said object data may be synchronized to said sound stream data even if some said second sequence marks are missing;

playing said sound stream data while searching for one of said second sequence marks; and finding said one of said second sequence marks in said sound stream data.

3. The method according to claim 1 further comprising the step of:

selecting a predetermined time interval between said first sequence marks prior to the step of storing said object, wherein said predetermined time interval is also used between said second sequence marks.

4. A system for compressing a sound stream data and synchronizing an object data and said sound stream data, said system comprising:

means for inserting a plurality of first sequence marks into said object data;

means for inserting a plurality of second sequence marks into said sound stream data;

means for deleting, without requiring user intervention, at least one silent segment of said sound stream data and any second sequence marks that reside in said at least one silent segment;

means for re-inserting the last deleted second sequence mark to said sound stream data in place of the deleted sound segment;

means for playing said sound stream data while searching for one of said second sequence marks; and means for displaying said object data at the highest drawing speed from where said object data has last been displayed to one of said first sequence marks corresponding to said one of said second sequence marks found whereby said object data may be synchronized to said sound stream data if some said second sequence marks are missing.

5. A computer program product comprising a computer readable medium having computer program logic recorded thereon for compressing sound stream data and synchronizing an object data and said sound stream data, said computer program logic comprising:

means for inserting a plurality of first sequence marks into said object data;

means for inserting a plurality of second sequence marks into said sound stream data;

means for deleting, without requiring user intervention, at least one silent segment of said sound stream data and any second sequence marks that reside in said at least one silent segment;

means for re-inserting the last deleted second sequence mark to said sound stream data in place of the deleted sound segment;

means for playing said sound stream data while searching for one of said second sequence marks; and means for displaying said object data at the highest drawing speed from where said object data has last been displayed to one of said first sequence marks corresponding to said one of said second sequence marks found whereby said object data may be synchronized to said sound stream data if some said second sequence marks are missing.

* * * * *